(12) United States Patent
Rózewicz et al.

(10) Patent No.: US 12,099,127 B2
(45) Date of Patent: Sep. 24, 2024

(54) METHOD AND DEVICE FOR ARRANGING A GRID STRUCTURE WITH RESPECT TO A VEHICLE POSITION

(71) Applicant: Aptiv Technologies AG, Schaffhausen (CH)

(72) Inventors: Maciej Rózewicz, Cracow (PL); Krzysztof Kogut, Cracow (PL); Jakub Porebski, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 331 days.

(21) Appl. No.: 17/664,574

(22) Filed: May 23, 2022

(65) Prior Publication Data

US 2022/0381923 A1 Dec. 1, 2022

(30) Foreign Application Priority Data

May 25, 2021 (EP) .................................... 21175739

(51) Int. Cl.
*G01S 19/39* (2010.01)
*G01S 19/47* (2010.01)

(52) U.S. Cl.
CPC ............ *G01S 19/393* (2019.08); *G01S 19/47* (2013.01)

(58) Field of Classification Search
CPC ............................... G01S 19/393; G01S 19/47
USPC ...................................................... 342/357.3
See application file for complete search history.

(56) References Cited

U.S. PATENT DOCUMENTS

| 10,354,150 | B2 * | 7/2019 | Yamazaki | ............ H04N 13/271 |
| 11,985,265 | B1 * | 5/2024 | Fujisaki | ............ H04N 1/00127 |
| 2017/0109644 | A1 * | 4/2017 | Nariyambut Murali | ..................... G06N 7/01 |
| 2020/0233434 | A1 * | 7/2020 | Chiappetta | ........... G01C 21/206 |

(Continued)

FOREIGN PATENT DOCUMENTS

| CN | 107505644 B | * | 5/2020 | .............. G01C 3/02 |
| DE | 102016122031 | | 5/2018 | |

(Continued)

OTHER PUBLICATIONS

"Extended European Search Report", EP Application No. 21175739.8, Nov. 18, 2021, 9 pages.

(Continued)

Primary Examiner — Harry K Liu
(74) Attorney, Agent, or Firm — Harness, Dickey & Pierce, P.L.C.

(57) ABSTRACT

A method is provided for arranging a grid with respect to a vehicle position. An initial position and a state of movement of the vehicle are determined. A physical grid specifying a spatial location of grid cells with respect to an earth-fixed coordinate system and a logical grid representing the cells within a memory are defined. An initial arrangement of the physical grid is determined with respect to the initial vehicle position. A mapping is defined between the physical and logical grids, and a torus interconnection is defined between margins of the logical grid. A modification of the vehicle position is determined based on the state of movement of the vehicle. By applying the torus interconnection, a revised logical grid is determined based on the modification of the vehicle position. A current arrangement of the physical grid is determined by mapping the revised logical grid.

20 Claims, 7 Drawing Sheets

(56) References Cited

U.S. PATENT DOCUMENTS

2021/0197809 A1\* 7/2021 Trukhanovich ........... G06T 7/70
2024/0181897 A1\* 6/2024 Hendrickson ........... B60L 50/60

FOREIGN PATENT DOCUMENTS

DE      102017126183      5/2019
WO      WO-2020065416 A1 \*   4/2020   ............ B60W 40/09

OTHER PUBLICATIONS

Dedien, et al., "Efficient Occupancy Grids for Variable Resolution Map Building", Jan. 1, 1998, 9 pages.
Eraqi, et al., "Static Free Space Detection with Laser Scanner using Occupancy Grid Maps", Oct. 2017, 8 pages.
Galvez, et al., "Grid-Based Multi-Sensor Fusion for On-Road Obstacle Detection: Application to Autonomous Driving", Aug. 2015, 158 pages.
Porebski, et al., "Performance Evaluation of the Highway Radar Occupancy Grid", Mar. 20, 2021, 22 pages.

\* cited by examiner

METHOD AND DEVICE FOR ARRANGING A GRID STRUCTURE WITH RESPECT TO A VEHICLE POSITION

INCORPORATION BY REFERENCE

This application claims priority to European Patent Application Number 21175739.8, filed May 25, 2021, the disclosure of which is incorporated by reference in its entirety.

BACKGROUND

Advanced driver assistance systems (ADAS) support a driver of a host vehicle to drive the vehicle more safely and comfortably. In order to perform properly and due to safety reasons, the environment of the host vehicle needs to be monitored e.g. in order to determine a free space in a lane of the host vehicle.

In order to determine such a free space for the host vehicle, a so-called occupancy grid technique has been developed, which analyzes the state of cells defined by a grid in front of the vehicle, i.e. if a respective cell of the grid is occupied, partly occupied, occluded or free.

Generally, the occupancy grid is used for representing a map of the environment for the vehicle as an evenly spaced field of cells. Each cell includes a random variable providing a probability for the presence of an obstacle at the location of the cell. Occupancy grid algorithms calculate approximate posterior estimates for the random variables.

For applying the information provided by an occupancy grid, it has to be assumed that the position of the host vehicle with respect to the occupancy grid is known. Therefore, this position of the host vehicle relative to the occupancy grid needs to be determined and tracked over time when the host vehicle is moving. During the movement of the host vehicle, it is necessary, under certain conditions, to move the occupancy grid as well and to update its cells (e.g., before the host vehicle is going to leave the occupancy grid).

For example, the host vehicle may start at some initial position and move and/or rotate on the current occupancy grid until it reaches a predefined distance from the initial position. After reaching this distance, the host vehicle is shifted to its initial position in the occupancy grid, and the origin of the occupancy grid, has therefore to be moved to a new position with respect to an earth-fixed coordinate system, which is independent of the movement of the host vehicle.

However, such a movement or shift of the occupancy grid requires that a large number of cells is shifted each time when such a shift is necessary. Since the shift is usually done when reaching a predefined distance, the time when the shift is performed is not deterministic. Hence, quite a big grid is needed. In summary, the known methods for positioning a host vehicle with respect to an occupancy grid and for tracking its position entail high requirements regarding memory size and copying operations in the memory, i.e. regarding the computational effort.

Accordingly, there is a need to have a method and a device for arranging an occupancy grid with respect to a host vehicle which requires a low computational effort.

SUMMARY

The present disclosure relates to a method and a device for arranging a grid structure (e.g., an occupancy grid) with respect to a position of a host vehicle. The present disclosure provides a computer-implemented method, a computer system, and a non-transitory computer-readable medium according to the independent claims. Embodiments are given in the subclaims, the description and the drawings.

In one aspect, the present disclosure is directed at a computer-implemented method for arranging a grid with respect to a position of a host vehicle. The grid includes a predefined number of cells. According to the method, an initial position and a state of movement of the host vehicle are determined in an earth-fixed coordinate system via a vehicle state sensor. Via a processing unit, a physical grid is defined, which specifies a spatial location of the cells of the grid with respect to the earth-fixed coordinate system, and a logical grid is defined which represents the cells of the grid within a memory of a processing unit of the host vehicle. An initial arrangement of the physical grid is determined with respect to the initial position of the host vehicle. A mapping is defined between the physical grid and the logical grid, and a torus interconnection is defined between margins of the logical grid. A modification of the position of the host vehicle is determined with respect to the earth-fixed coordinate system and with respect to the physical grid based on the state of movement of the host vehicle. By applying the torus interconnection between the margins of the logical grid, a revised logical grid is determined based on the modification of the position of the host vehicle. A current arrangement of the physical grid with respect to the host vehicle is determined based on the mapping of the revised logical grid.

The method may be applied to any grid model which is related to the environment of the vehicle. For example, the grid may be an occupancy grid which includes a plurality of cells, and each cell represents an occupancy state of the portion of a space which is limited by a boundary of the respective cell. The occupancy state may be a binary random variable (probability), a basic belief assignment, or some other form of occupancy representation. The basic belief assignment refers to a generalized probability theory, i.e. values assigned to the grid may be not only probabilities, which leads to a dynamic occupancy grid based e.g. on a Dempster-Shafer evidence theory which uses the basic belief assignment instead of probabilities.

The position of the host vehicle is given by a predefined position on the vehicle (e.g., at the center of host vehicle's rear axle or at its center of gravity. Generally, a reference point specified anywhere in the vehicle may be used as the position of the host vehicle. The host vehicle may rotate with respect to the position of the host vehicle within the grid. As usual, the earth-fixed coordinate system is a three-dimensional, right-handed coordinate system having a fixed origin at a certain point in space and does neither move nor rotate with respect to this point. The earth-fixed coordinate system may be a world coordinate system based on global positioning. Without global positioning, however, an incremental, fixed coordinate may also be suitable for performing the method. In contrast, the grid is a flat plane in which two directions are defined for arranging the cells of the grid. In other words, the grid is a two-dimensional entity.

The state of movement of the host vehicle may include a velocity, an acceleration and/or a yaw rate of the host vehicle in the world coordinate system. The modification of the position of the host vehicle is related to a current state of movement of the host vehicle and to a current position of the host vehicle which is different from the initial position. Generally, the modification includes two aspects, i.e. a change of the vehicle position with respect to the earth-fixed coordinate system and a change of the vehicle position with respect to the physical grid. That is, the two aspects of the modification may be different from one another.

Specifying the spatial location of the cells by the physical grid with respect to the earth-fixed coordinate system may include that an origin of the physical grid, i.e. of a coordinate system in which rows and columns of cells of the physical grid are defined, and the orientation of the rows and columns may be determined in the earth-fixed coordinate system.

The margins of the logical grid refer to the first and to the last rows and columns of cells of the logical grid, respectively. Due to the torus interconnection, an entity defined on the logical grid may disappear at one margin and emerge again at an opposite margin of the logical grid (e.g., when a shifting operation is performed for this entity on the logical grid).

The logical grid may be updated periodically in predefined time intervals. Due to the mapping, the physical grid may also be updated periodically. Therefore, the method steps may be repeated periodically as well, wherein the initial position and the initial arrangement of the physical grid will be replaced by a previous position and a previous arrangement, respectively, corresponding to a current position and a current arrangement at a previous point in time.

Due to the mapping, rows and columns of cells being revised in the logical grid may correspond to cells which are added at one or two margins of the physical grid, while cells at the opposite margins may be removed. Therefore, the physical grid may be shifted in space, i.e. with respect to the earth-fixed coordinate system, when the logical grid is revised.

When the host vehicle is moving and its position is modified accordingly, the logical grid may be revised at least partly. However, due to the torus interconnection, the number of cells to be revised is small (e.g., in comparison to known shifting methods). That is, no copying of the entire grid is required. Hence, only a small number of operations is required for revising the logical grid. Therefore, the computational effort for performing the method is quite low, although a mapping is required between the physical and logical grids. In addition, the revision of the cells is directly connected to the movement of the vehicle and, therefore, deterministic.

The method may comprise one or more of the following features:

The physical grid may have a fixed orientation with respect to the earth-fixed coordinate system. The torus interconnection may relate opposite margins of the logical grid to each other. Furthermore, the torus interconnection may be implemented in a two-dimensional coordinate system.

The modification of the position of the host vehicle with respect to the physical grid may depend on a predefined positioning function, which may specify a desired position of the host vehicle in the physical grid. The predefined positioning function may provide a fixed position of the host vehicle in the physical grid. Alternatively, the predefined positioning function may depend on a velocity and/or on a yaw rate of the host vehicle, which may be determined by the vehicle state sensor.

A virtual coordinate system may be defined in the logical grid. An origin of the virtual coordinate system may correspond to a reference position in the physical grid, and the origin of the virtual coordinate system may be shifted from an initial offset position to a current offset position in accordance with the modification of the position of the host vehicle. Cells to be updated in the logical grid may be identified based on the initial offset position and the current offset position of the origin of the virtual coordinate system. The initial offset position and the current offset position of the origin of the virtual coordinate system may specify rows and columns of the logical grid which are to be updated.

The physical grid may be defined with respect to a grid coordinate system, and a correction defined in the grid coordinate system may be calculated for the position of the host vehicle in relation to a cell in which the host vehicle may be currently located. The correction may depend at least partly on a difference of the initial position and a current position of the host vehicle in the earth-fixed coordinate system. The vehicle state sensor may include a global positioning system (GPS) and/or an inertial measurement unit (IMU) in order to determine the position of the host vehicle with respect to the earth-fixed coordinate system. The modification of the position of the host vehicle with respect to the earth-fixed coordinate system may be determined by using a Kalman filter.

According to an embodiment, the physical grid may have a fixed orientation with respect to the earth-fixed coordinate system. That is, during a movement of the host vehicle there may be no rotation between the earth-fixed coordinate system and the physical grid or a grid coordinate system in which the physical grid is defined. In other words, a fixed angle may be defined between axes of the earth-fixed coordinate system and axes of the grid coordinate system which may be used to define the rows and columns of the physical grid. Due to the fixed orientation, the generation and the interpretation of the physical grid and its contents may be facilitated.

The torus interconnection may relate opposite margins of the logical grid to each other. Therefore, the number of copying operations in the logical grid may be reduced when the logical grid is revised. Instead, indices of cells may be updated only. Further, the torus interconnection may be implemented in a two-dimensional coordinate system. Even higher dimensional (e.g., three-dimensional, 2.5-dimensional) occupancy grids may use a two-dimensional torus interconnection, which may reduce the computational effort for such grids.

According to another embodiment, the modification of the position of the host vehicle with respect to the physical grid may depend on a predefined positioning function which may specify a desired position of the host vehicle in the physical grid. As one option, the predefined positioning function may provide a fixed position of the host vehicle in the physical grid. Alternatively, the predefined positioning function may depend on a velocity and/or on a yaw rate of the host vehicle, which may be determined by the vehicle state sensor.

For example, the desired position may be requested to be close to the center of the physical grid, or some offset might be allowed between the desired position and the center of the physical grid. The offset may be defined as a two-dimensional vector depending on the respective components of the velocity and/or on the yaw rate. Due to specifying the desired position via the positioning function, it may be prevented that the host vehicle may move too close to the margins of the physical grid or even disappear from the physical grid.

According to a further embodiment, a virtual coordinate system may be defined in the logical grid which may have an origin corresponding to a reference position in the physical grid. The origin of the virtual coordinate system may be shifted from an initial offset position to a current offset position in accordance with the modification of the position of the host vehicle. For example, the reference position in the physical grid may be a lower left corner or the corresponding cell of the physical grid. Due to the mapping between the physical and logical grids, the shift of the virtual coordinate system in the logical grid may correspond to a shift of the entire physical grid. Since the virtual coordinate system may be shifted in accordance with the movement of the host vehicle, the shift of the virtual coordinate system may ensure that the physical grid follows the movement of the host vehicle due to the relationship of the origin of the virtual coordinate system to the reference position.

Cells to be updated in the logical grid may be identified based on the initial offset position and the current offset position of the origin of the virtual coordinate system. The initial offset position and the current offset position of the origin of the virtual coordinate system may specify rows and columns of the logical grid which are to be updated.

Accordingly, the logical grid may be revised in a restricted area only, the size of which may depend e.g. on the velocity of the host vehicle. Hence, the number of cells to be updated may be restricted, and the effort for updating the logical and physical grid may be reduced e.g. in comparison to shifting methods for occupancy grids which may require a large number of copying operations. For updating the cells in the physical grid, cells may be added and deleted at the margins of the physical grid only.

According to a further embodiment, the physical grid may be defined with respect to a grid coordinate system. In detail, the rows and columns of the cells of the physical grid may extend along the axis of the grid coordinate system. A correction which is defined in the grid coordinate system may be calculated for the position of the host vehicle in relation to a cell in which the host vehicle may be currently located. The correction may depend at least partly on a difference of the initial position and a current position of the host vehicle in the earth-fixed coordinate system.

The correction may provide a refinement for the position of the host vehicle in the grid coordinate system since the movement of the host vehicle can be tracked by discrete steps only in the physical grid due to the discrete representation of the grid by a certain number of cells which imply a certain restricted grid resolution. Therefore, the correction may improve the accuracy of the host vehicle position. The uncertainty of the host vehicle position may therefore be smaller than the grid resolution. On the other hand, the correction may also depend on the grid resolution.

The correction and the difference of the initial and current vehicle position may be defined as a vector in the respective coordinate system. Therefore, the difference of the initial and current positions may include a respective difference component along each of the axes of the physical coordinate system, and the correction may include a respective correction component along each of the axes of the physical coordinate system. Each correction component may depend on the sign of the corresponding difference component. In other words, the correction components may depend on the direction in which the vehicle is moving and have different absolute values in different directions. By this means, the accuracy of the vehicle position in the grid coordinate system is further enhanced.

The vehicle state sensor may include a global positioning system (GPS) and/or an inertial measurement unit (IMU) in order to determine the position of the host vehicle in the earth-fixed coordinate system. The GPS and/or the IMU may already be installed in the host vehicle (e.g., as part of driver assistance systems). Therefore, no additional hardware may be required for determining the position and the velocity of the host vehicle and for performing the method. Generally, earth-fixed positioning of the host vehicle may be an output of any filtering algorithm. If a high precision GPS sensor is used, no filtering may be needed.

The modification of the position of the host vehicle may be determined in the earth-fixed coordinate system by using a Kalman filter. That is, an initial position of the host vehicle is determined via the vehicle state sensor only, and the further movement of the host vehicle may be tracked by the use of the Kalman filter. It has turned out that the use of such a Kalman filter may provide a sufficient accuracy for the tracking of the host vehicle with respect to the grid. Therefore, the effort for tracking the movement of the host vehicle may be reduced.

In another aspect, the present disclosure is directed at a device for arranging a grid with respect to a position of a host vehicle, wherein the grid includes a predefined number of cells. The device comprises at least one vehicle state sensor configured to detect an initial position of the host vehicle and a state of movement of the host vehicle in an earth-fixed coordinate system, and a processing unit. The processing unit is configured to define a physical grid which specifies a spatial location of the cells of the grid with respect to the earth-fixed coordinate system, to define a logical grid which represents the cells of the grid within a memory of a processing unit of the host vehicle, to determine an initial arrangement of the physical grid with respect to the initial position of the host vehicle, to define a mapping between the physical grid and the logical grid, to define a torus inter-connection between margins of the logical grid, to determine a modification of the position of the host vehicle with respect to the earth-fixed coordinate system and with respect to the physical grid based on the state of movement of the host vehicle, to determine a revised logical grid based on the modification of the position of the host vehicle by applying the torus interconnection between the margins of the logical grid, and to determine a current arrangement of the physical grid with respect the host vehicle based on the mapping of the revised logical grid.

As used herein, the terms processing device, processing unit and module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

In summary, the device according to the disclosure includes at least one vehicle state sensor and a processing unit which are configured to perform the steps as described above for the corresponding method. Therefore, the benefits, the advantages and the disclosure as described above for the method are also valid for the device according to the disclosure.

In another aspect, the present disclosure is directed at a computer system, said computer system being configured to carry out several or all steps of the computer-implemented method described herein.

The computer system may comprise a processing unit, at least one memory unit, and at least one non-transitory data storage. The non-transitory data storage and/or the memory unit may comprise a computer program for instructing the computer to perform several or all steps or aspects of the computer-implemented method described herein.

In another aspect, the present disclosure is directed at a non-transitory computer-readable medium comprising instructions for carrying out several or all steps or aspects of the computer-implemented method described herein. The computer-readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer-readable medium may be configured as a data storage that is accessible via a data connection, such as an internet connection. The computer-readable medium may, for example, be an online data repository or a cloud storage.

The present disclosure is also directed at a computer program for instructing a computer to perform several or all steps or aspects of the computer-implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
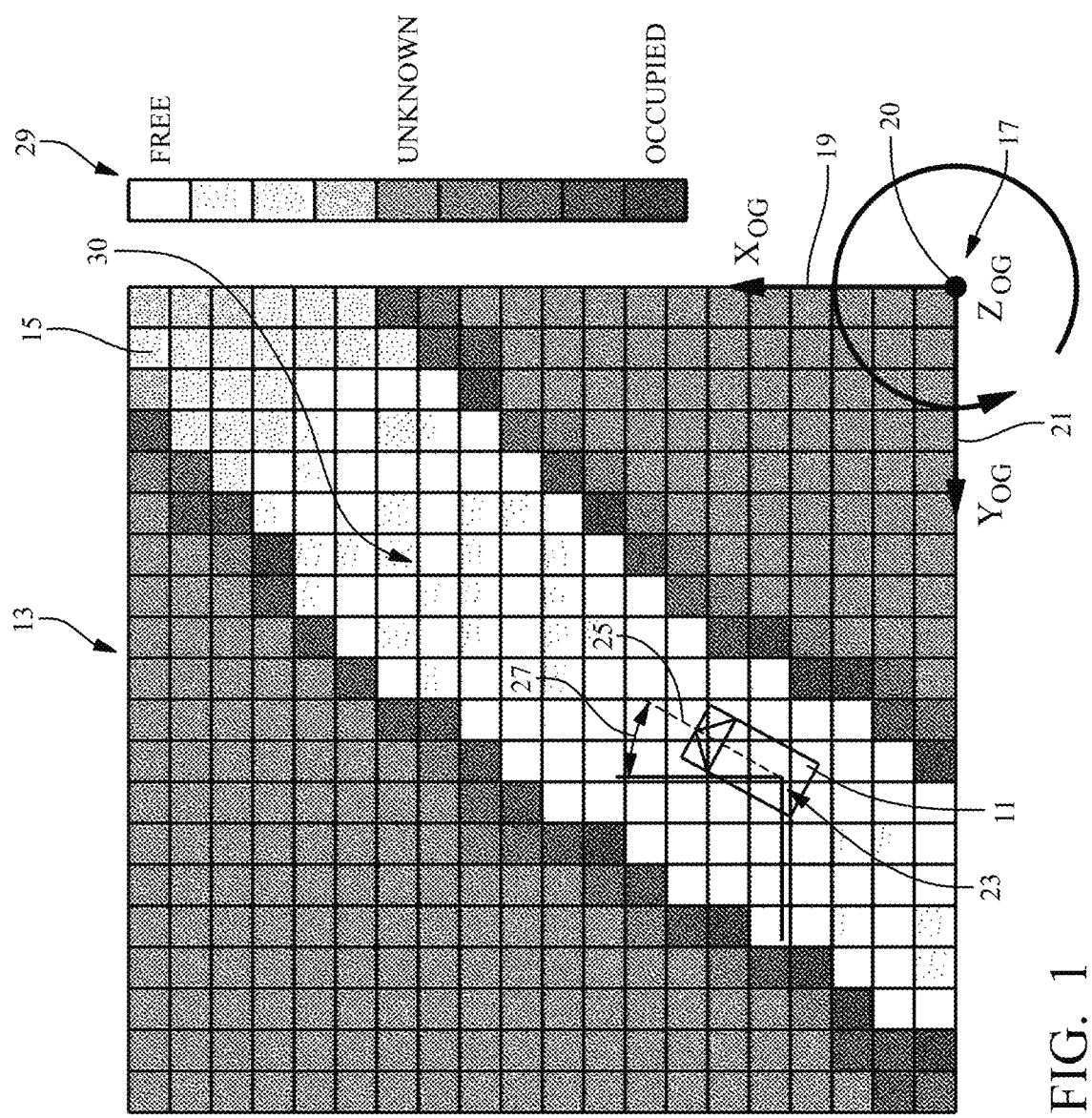
FIG. 1 depicts an overview of an occupancy grid and a host vehicle located in the occupancy grid.

FIG. 1 depicts a host vehicle 11 which is located in an occupancy grid 13. The occupancy grid 13 includes a plurality of cells 15 which are defined with respect to an occupancy grid coordinate system (OGCS) 17. The occupancy grid coordinate system 17 includes an X-axis 19 and a Y-axis 21 which are used for aligning and indexing the cells 15 of the occupancy grid 13. Although the occupancy grid 13 is referred to in the following for the present embodiment, the method and a device 37 (see FIG. 3) as described below may also be applied to any grid model which is related to the environment of the host vehicle 11.

In detail, the columns and rows of the cells 15 are aligned along the X-axis 19 and the Y-axis 21, respectively, and the indices of the cells 15 are defined with respect to an origin 20 of the occupancy grid coordinate system 17. The Z-axis of the occupancy grid coordinate system 17 extends perpendicularly upwards from the page of FIG. 1 and is not relevant for defining the occupancy grid 13. However, the Z-axis as used has a reference for defining a yaw angle of the vehicle 11.

Within the occupancy grid 13, the vehicle 11 has a vehicle position 23 which includes a reference point on the vehicle 11 (e.g., at the center of rear axle of the vehicle 11 (see FIG. 4) or at its center of gravity. The vehicle position 23 is related to one of the cells 15 reflecting the current position of the host vehicle 11 with respect to the occupancy grid 13.

The vehicle position 23 is further related to the occupancy grid coordinate system 17 by defining an X-coordinate and a Y-coordinate for the vehicle position 23.

Figure 2:
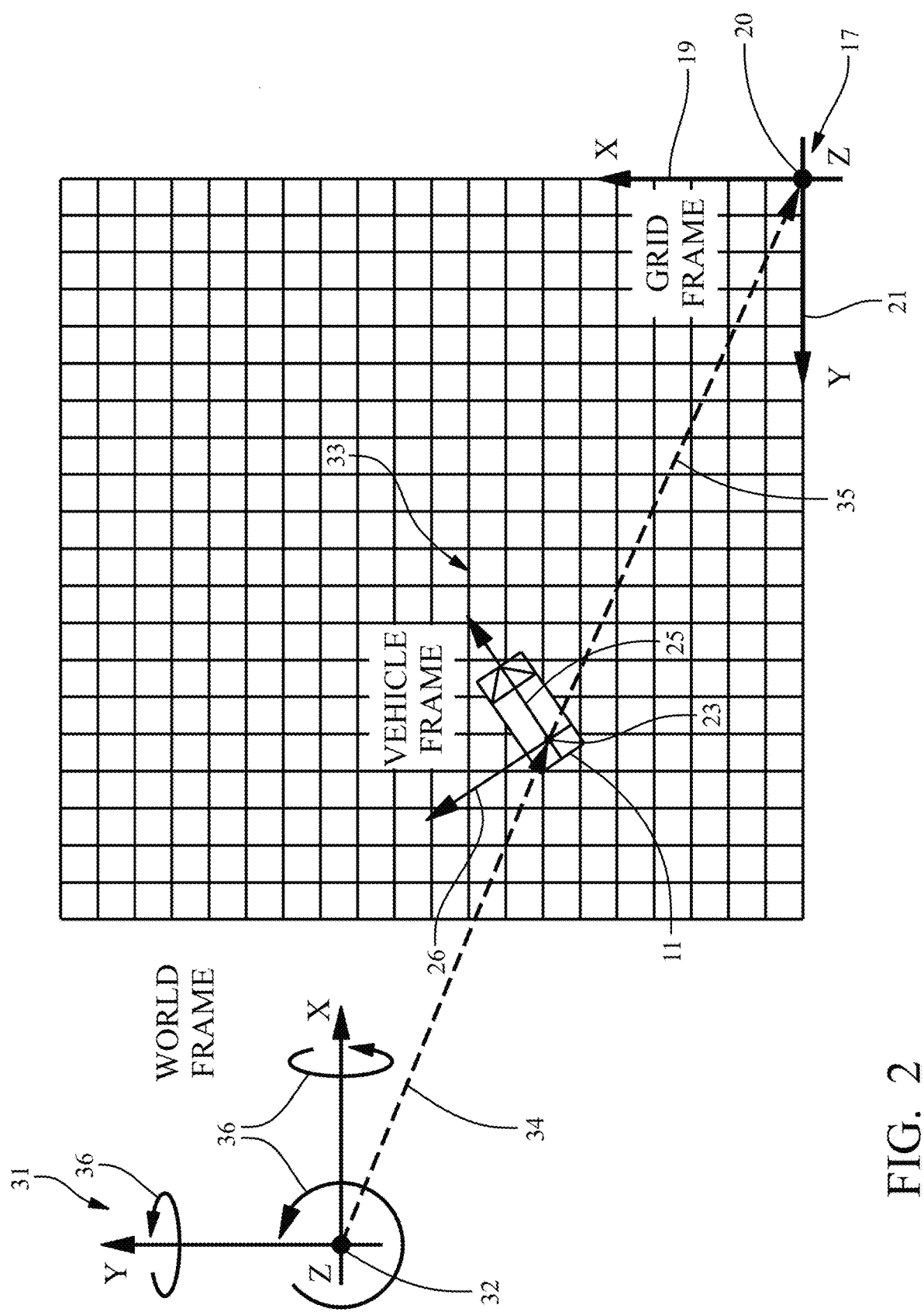
FIG. 2 depicts relationships between coordinate systems which are relevant to the host vehicle.

The vehicle 11 includes a longitudinal axis 25 which defines an X-axis of a vehicle frame or vehicle coordinate system 33 (see FIG. 2). An angle 27 is defined between the longitudinal axis 25 of the host vehicle 11 and the X-axis 19 of the occupancy grid coordinate system 17. The angle 27 corresponds to the yaw angle of the host vehicle 11 with respect to the occupancy grid coordinate system 17. For better orientation, respective lines parallel to the X-axis 19 and to the Y-axis 21 are depicted starting from the vehicle position 23.

The occupancy grid 13 includes a square frame of 400 cells in the example of FIG. 1, i.e. 20 rows and 20 columns of cells 15 in the X-direction and the Y-direction, respectively. However, the occupancy grid 13 may include a much larger number of cells 15 for practical purposes in automotive applications. To each of the cells 15, a random variable is assigned indicating the probability for each cell 15 being occupied or not. In FIG. 1, a legend 29 is also depicted which reflects the occupancy status for each cell 15.

The white cells 15 are regarded as free and drivable for the host vehicle 11, i.e. the value of the corresponding random variable is close to 0. In contrast, the dark cells 15 are regarded as occupied, e.g. by obstacles located at the borders of a lane 30 in which the host vehicle 11 is currently located and moving. The random variables which are assigned to the dark cells 15 have therefore a value close to 1. In addition, the grey cells 15 are regarded as unknown. That is, via detections of vehicle sensors (not shown) it is actually not possible to assess whether the respective grey cells 15 are occupied or not. The vehicle sensors may include a camera, a radar system and/or a lidar system, for example. The random variables related to the grey cells 15 have a value of approximately 0.5. The information provided by the occupancy grid 13 is typically used by an advanced driver assistance system (ADAS), e.g. for collision avoidance and/or for defining a drivable trajectory for the host vehicle 11.

FIG. 2 depicts the occupancy grid coordinate system 17, which may also be referred to as a grid frame, and its relationships to further coordinate systems (31, 33) which are also relevant for the host vehicle 11. These coordinate systems include a world coordinate system 31 (WCS 31) which is an inertial coordinate system having an origin 32 at a fixed point in space. The world coordinate system 31 does neither move nor rotate. Without global positioning, however, any earth-fixed coordinate system (i.e. an incremental, fixed coordinate system) may also be suitable for the method and the device 37 according to the disclosure.

In addition, the vehicle coordinate system 33 (also referred to as vehicle frame) is shown which has its origin at the vehicle position 23 (see also FIG. 1). The vehicle coordinate system 33 can be translated and rotated relative to the world coordinate system 31. The X-axis 25 of the vehicle coordinate system 33 extends along the longitudinal axis of the host vehicle 11, whereas its Y-axis 26 extends in the lateral direction with respect to the host vehicle 11. Furthermore, the occupancy grid coordinate system 17 is depicted together with its origin 20, its X-axis 19 and its Y-axis 21. With respect to the occupancy grid coordinate system 17, the cells 15 of the occupancy grid 13 are defined, as mentioned above. The occupancy grid coordinate system 17 can be shifted, i.e. it can perform a translational motion relative to the world coordinate system 31, but it cannot rotate with respect to the world coordinate system 31.

The spatial location of the vehicle coordinate system 33 and the occupancy grid coordinate system 17 with respect to the world coordinate system 31 is defined by the respective position vector of the vehicle position 23 and the origin 20, respectively, with respect to the world coordinate system 31 (as indicated by the dashed arrows 34 and 35 in FIG. 2), and by the respective yaw, pitch and roll angles of the vehicle coordinate system 33 and the occupancy grid coordinate system 17 with respect to the axes of the world coordinate system 31. The angles are indicated in FIG. 2 by the arrows 36.

Figure 3:
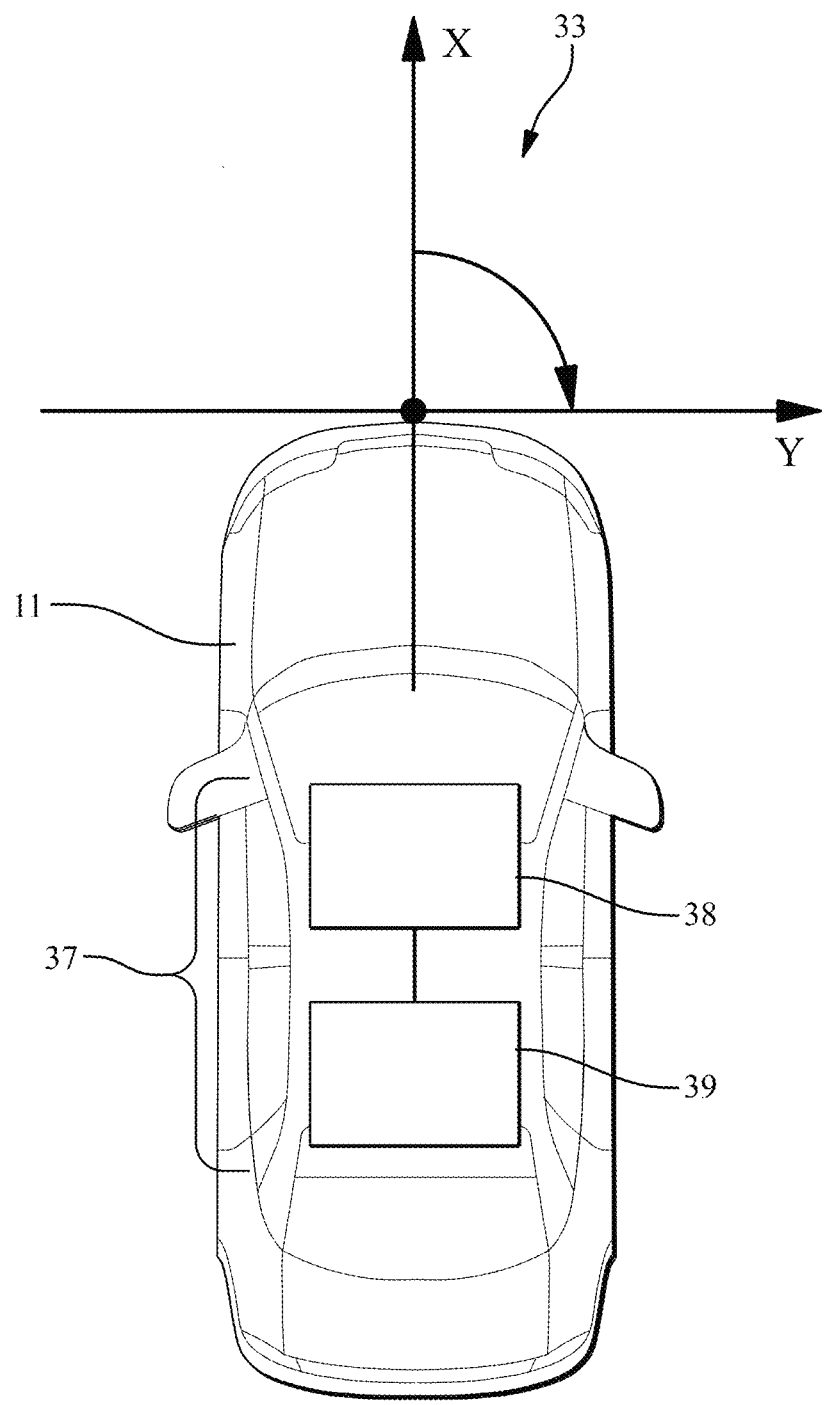
FIG. 3 depicts the host vehicle including a device for performing the method according to the disclosure.

FIG. 3 depicts the vehicle 11 and the vehicle coordinate system 33 again which is now defined with respect to a reference point at the bumper of the vehicle, and in contrast to the other figures, it is shown as a left-handed coordinate system. It is noted, however, that the method and the device 37 according to the disclosure do not depend on the definition of the vehicle coordinate system and can be applied in right-handed and left-handed coordinate systems. The vehicle 11 further includes the device 37 for arranging the occupancy grid 13 with respect to the position 23 of the host vehicle 11. The device 37 includes a vehicle state sensor 38 and a processing unit 39. The sensor 38 and the processing unit 39 are connected to each other such that the processing unit 39 is configured to receive data provided by the sensor 38. The sensor 38 includes a global positioning system and/or an inertial measurement unit in order to determine the position of the host vehicle 11 in the world coordinate system 31 and/or a state of movement of the host vehicle 11, i.e. its velocity, its acceleration and its yaw rate.

When the host vehicle 11 starts moving, the vehicle position 23 will change with respect to the world coordinate system 31 (see FIG. 2) and with respect to the occupancy grid coordinate system 17. Within the occupancy grid 13, the vehicle position 23 will move from an initial cell 15 to other cells 15. If the host vehicle 11 tends to approach at the margins of the occupancy grid 13, the origin 20 of the occupancy grid coordinate system 17 needs to move with respect to the world co-ordinate system 31 in order to follow the host vehicle 11. In addition, the cells of the occupancy grid 13 need to be updated due to the movement of the origin 20 of the occupancy grid coordinate system 17.

Figure 4:
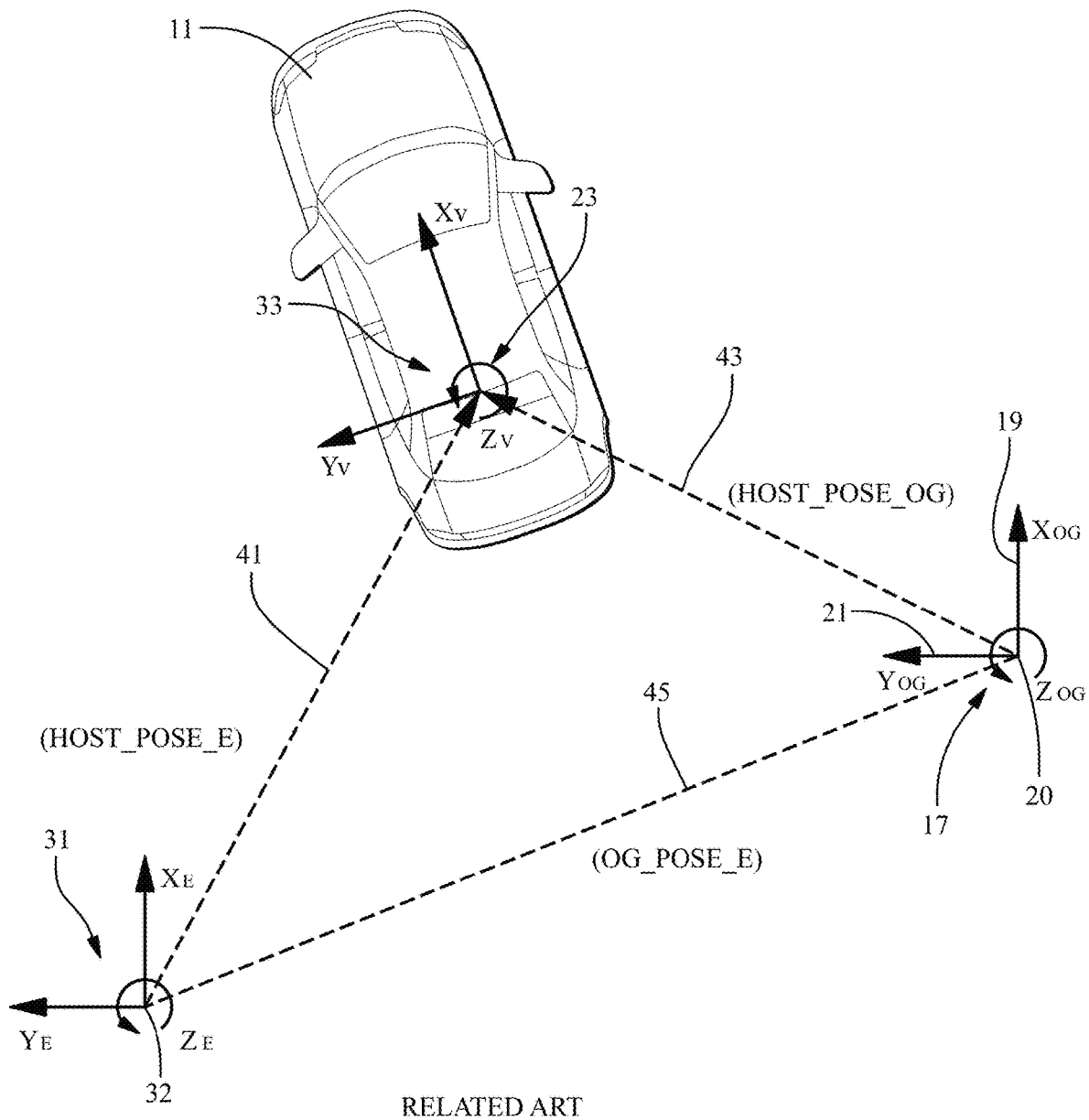
FIG. 4 depicts a method according to the related art for shifting an occupancy grid when the host vehicle is moving.

FIG. 4 depicts a method according to the related art for moving an occupancy grid 13 in response to the movement of the host vehicle 11. First, the occupancy grid coordinate system 17 has an initial position for its origin 20 as well as for its X- and Y-axes 19, 21 with respect to the origin 32 of the world coordinate system 31 (see also FIG. 2). The axes of the world coordinate system 31 are denoted by the subscript "E" which refers to "earth-fixed", whereas the axes of the occupancy grid coordinate system 17 are denoted by the subscript "OG".

With respect to the origin 32 of the world coordinate system 31, the vehicle position 23 has a position vector 41 which corresponds to the arrow 34 as shown in FIG. 2. With respect the origin 20 of the occupancy grid coordinate system 17, the vehicle position 23 has a position vector 43 which corresponds to the "inverse" of the arrow 34 as shown in FIG. 2. In the world coordinate system 31, the origin of the occupancy grid coordinate system 17 has a position vector 45 which corresponds to the "sum" of the arrows 34 and 35 as shown in FIG. 2.

When the host vehicle 11 is moving, the absolute value of the position vector 43 indicating the distance of the vehicle position 23 with respect to the initial origin 20 of the occupancy grid coordinate system 17 may reach a predefined threshold after some time such that a movement of the occupancy grid coordinate system 17 will be necessary. In this case, the position vector 45 of the initial origin 20 has to be changed such that a shifted origin of the occupancy grid coordinate system 17 will define the spatial location of the cells 15 of the occupancy grid 13 with respect to a revised X-axis and a revised Y-axis of the shifted occupancy grid coordinate system.

In other words, the origin 20 of the occupancy grid coordinate system 17 follows the movement of the host vehicle 11 in a stepwise manner, and each shifting step being applied to the position vector 45 is determined via the threshold for the distance between the vehicle position 23 and the origin 20 of the occupancy grid coordinate system 17 (i.e. the absolute value of the position vector 43) according to the related art. When applying such a shift procedure to the occupancy grid 13, the cells 15 need to be updated which is partly accomplished by shifting or copying cells and partly by adding and removing cells.

Hence, a large number of cells needs to be copied or renewed if the shift procedure according to the related art is applied. In addition, the shift of the occupancy grid coordinate system 17 is not deterministic in the sense that the point in time is not known in advance at which the shift will be necessary. Therefore, a continuous shifting of the occupancy grid with respect to the world coordinate system 31 has been proposed in the related art. However, such a continuous shifting may require an additional computational effort for continuously copying the cells and the random variables although such a continuous shift may provide a better adaptation of the occupancy grid 13 to the required field of view of the host vehicle 11 than the shift method using a predefined threshold.

Figure 5:
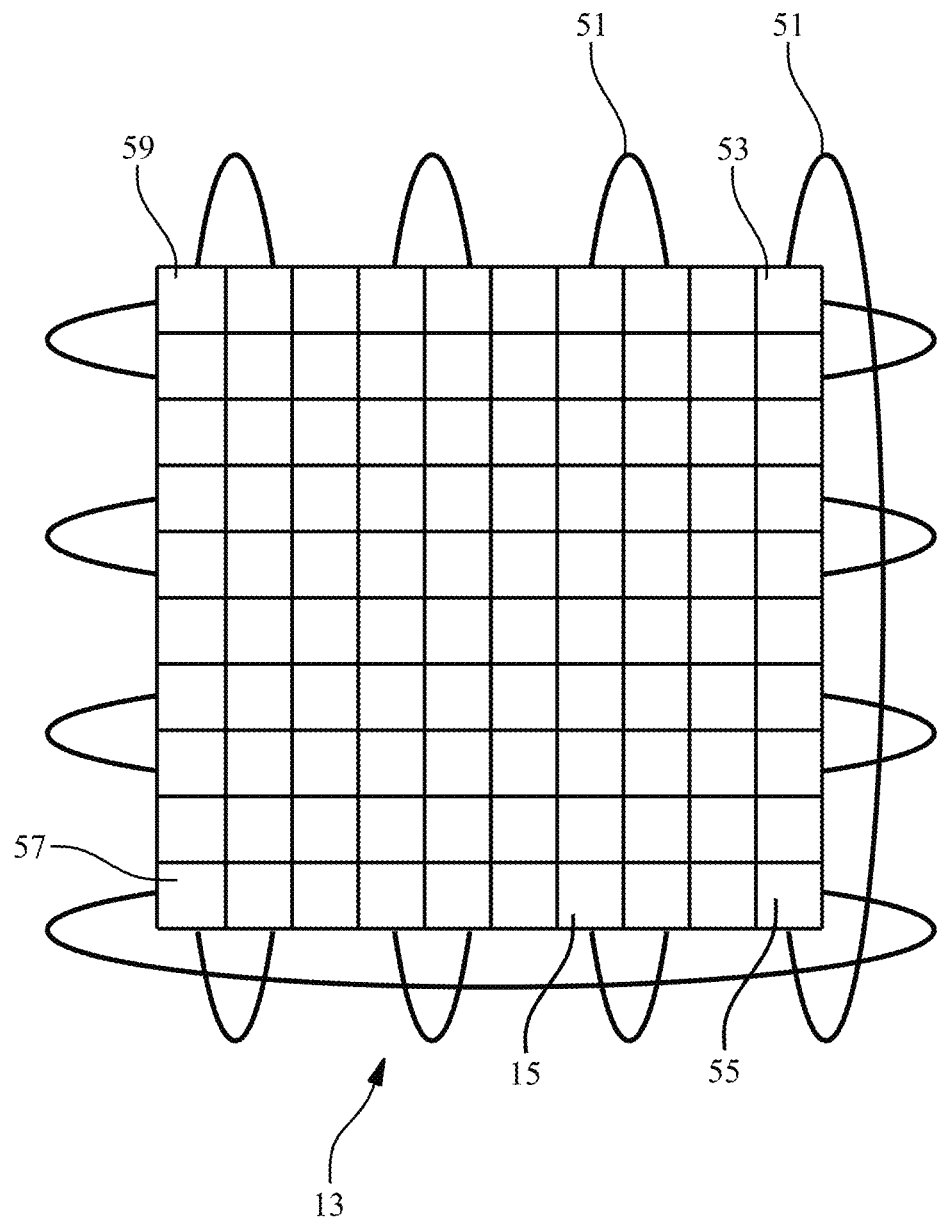
FIG. 5 depicts a torus interconnection for an occupancy grid.

FIG. 5 depicts an occupancy grid 13 according to the disclosure which includes cells 15 for which a torus interconnection is defined between the cells 15 located at opposite margins of the occupancy grid 13.

In detail, the outermost rows and columns of the occupancy grid 13 are connected by interconnections 51 which are represented as lines in FIG. 5. For example, the rightmost cell 53 in the upper row of the grid 13 has an interconnection 51 to the rightmost cell 55 in the lower row of the grid 13. Due to the interconnection line 51, the grid 13 can be regarded as bent to form a cylinder such that the cells 53 and 55 were adjacent to each other. In the same manner, there is an interconnection line 51 between the cell 55 in the lower right corner of the grid 13 and the cell 57 in the lower left corner of the grid 13. Furthermore, there is also an interconnection 51 between the cell 53 in the upper right corner of the grid 13 and the cell 59 in the upper left corner. For the sake of clarity, every third interconnection line 51 is shown in FIG. 5 only, and the entire line for the interconnection 51 is shown for connecting the cells 53 and 55 as well as for connecting the cells 55 and 57 only. Hence, one has to imagine that most of the shown interconnections 51 include lines which are hidden behind the cells 15 of the grid 13. Therefore, each cell at the margins of the grid 13 has an interconnection 51 with two further cells at the respective opposite borders of the grid 13. That is, one can further imagine that after connecting opposite ends of the grid 13 to form a cylinder, this cylinder may be further bent to a torus by connecting the opposite ends of the cylinder as well.

Due to the torus interconnections 51 between the borders of the grid 13, the content of the cell 53 appears at cell 55 if the grid is shifted upwards (e.g., due to a corresponding movement of the host vehicle 11). Similarly, the content of the cell 55 appears at the cell 57 if the grid 13 is shifted to the right.

Figure 6A:
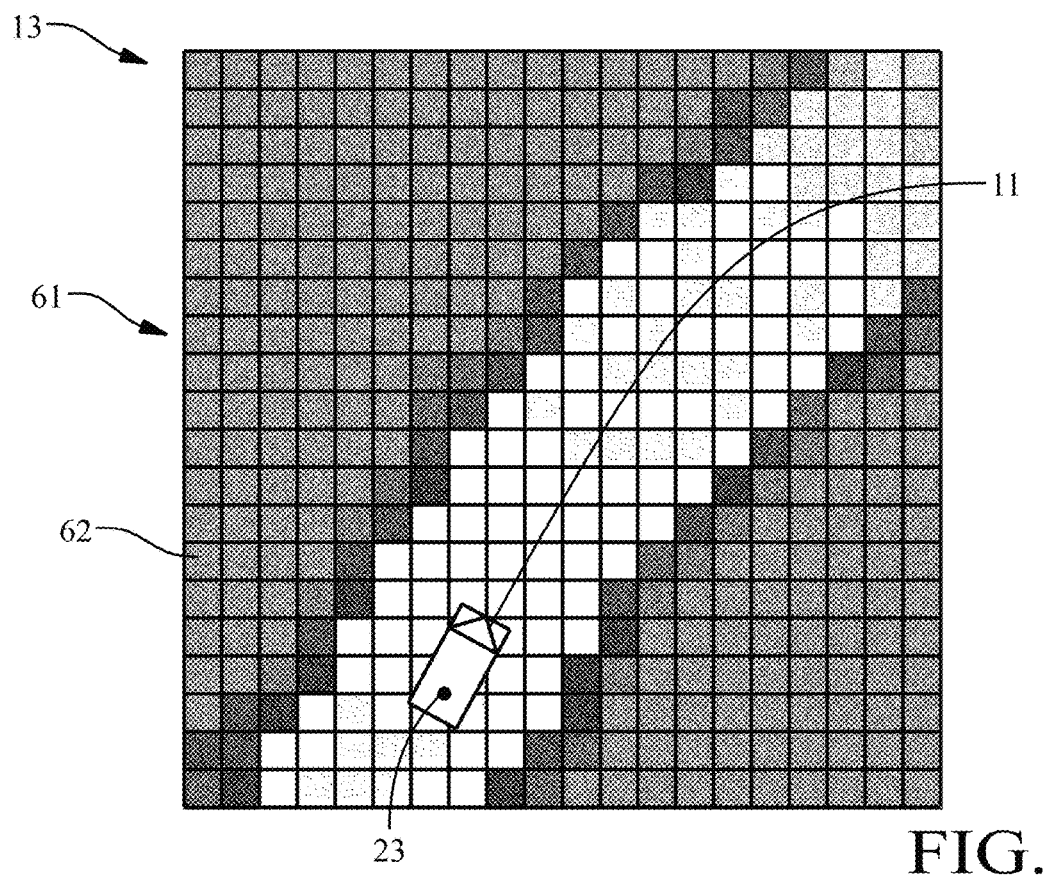
FIG. 6A depicts the occupancy grid from FIG. 1 as a physical grid.

FIG. 6A depicts the occupancy grid 13 from FIG. 1 which is also denoted as a physical grid 61 since it represents an occupancy grid in "the real world". That is, the physical grid 61 is defined with respect to the occupancy grid coordinate system 17 (see FIGS. 1 and 2) which has a defined relationship to the world coordinate system 31 (see FIG. 2). Therefore, each cell 15 of the physical grid 61 can be assigned to specific coordinates in the world coordinate system 31 (see FIG. 2). The host vehicle 11 is also shown in FIG. 6A together with the vehicle position 23 which is therefore assigned to a certain cell in the physical grid 61 and to coordinates in the occupancy grid coordinate system 17 as well as in the world coordinate system 31.

Figure 6B:
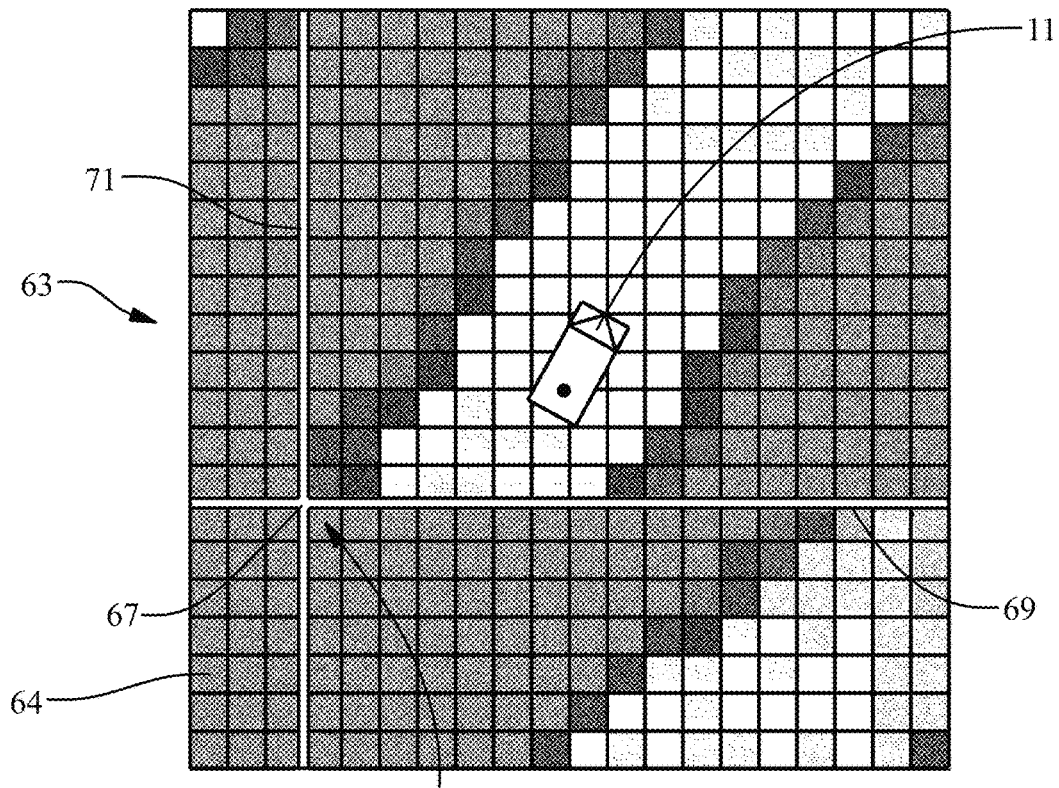
FIG. 6B depicts a logical grid that corresponds to the physical grid from FIG. 6A.

In FIG. 6B, a logical grid 63 is shown which represents the occupancy grid 13 in a memory of the processing unit 39. The logical grid 63 includes cells 64 which correspond to the cells 62 of the physical grid 61. That is, the physical grid 61 and the logical grid 63 have the same number of cells 62, 64 since they are just different representations of the occupancy grid 13 as shown in FIG. 1. A mapping is defined between the cells 62 of the physical grid 61 and the cells 64 of the logical grid 63.

Within the logical grid 63, a virtual coordinate system 65 is defined having an origin 67 which corresponds to the lower left corner 68 of the physical grid 61. Therefore, the vehicle position 23 has the same distance to the origin 67 in the virtual coordinate system 65 as in the physical grid 61 with respect to the lower left corner (i.e. seven cells to the right and three cells upwards).

In addition, the logical grid 63 includes torus interconnections 51 as described in context of FIG. 5 between the respective opposite margins. The vehicle position 23 is located in the center of the logical grid 63 for the present example. In order to provide the same relationship of the vehicle position 23 with respect to the origin 67 in the logical grid 63 as in the physical grid 67 with respect to the lower left corner, the cells 64 of the logical grid 63 are arranged in accordance to the torus interconnection with respect to the physical grid 61. That is, the cells of the physical grid 61 have to be shifted by seven cells to the upper side and by three cells to the right in order to "move" the vehicle position 23 to the center of the logical grid 63.

Due to the torus interconnection of the logical grid 63, the upper seven rows of the physical grid 61 appear on the lower side of the logical grid 63, i.e. below a horizontal axis 69 of the virtual coordinate system 65. In other words, a row of cells 62 of the physical grid 61 disappears when it comes into contact with the upper side of the grid and emerges again at the lower side of the grid 63 due to the torus interconnection between the opposite margins. In the same manner, the three rightmost columns of cells 62 disappear at the right side of the physical grid 61 and emerge again at the opposite left side of the logical grid 63.

Figure 7A:
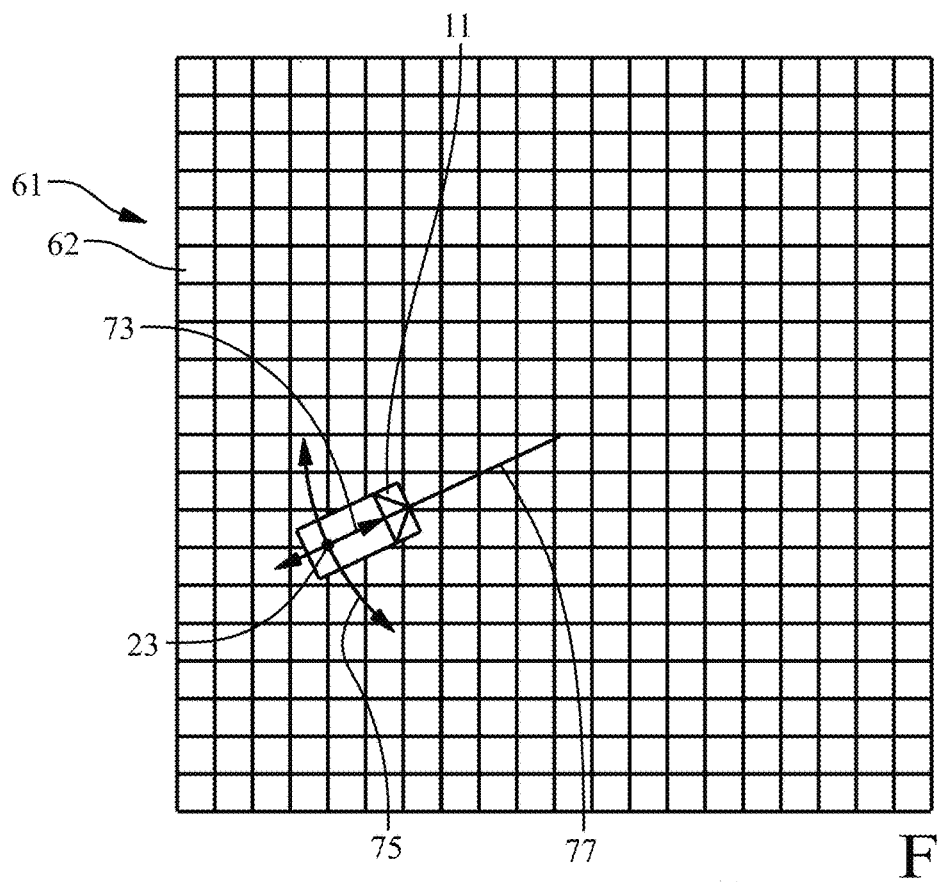
FIG. 7A depicts details for tracking the host vehicle in the physical grid from FIG. 6A.
Figure 7B:
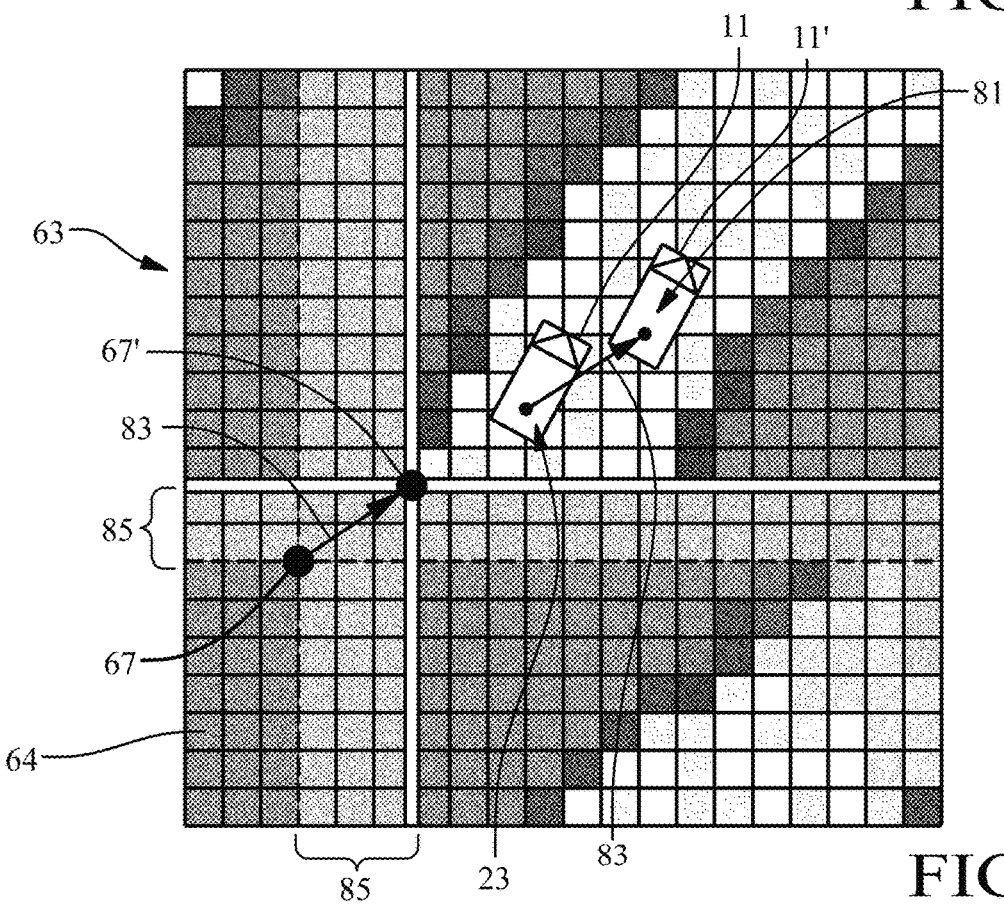
FIG. 7B depicts details for updating the logical grid in accordance with a movement of the host vehicle.

FIGS. 7A and 7B illustrates how a movement of the host vehicle 11 is tracked and how the logical grid 63 is updated in accordance with the movement of the host vehicle 11. Due to the mapping between the logical grid 63 and the physical grid 61, the physical grid 61 will also be updated if the logical grid 63 is revised.

In FIG. 7A, the physical grid 61 is depicted again including the host vehicle 11 and the vehicle position 23. When the host vehicle 11 starts moving, its position 23 and its orientation changes in accordance with the velocity and the yaw rate. This is indicated in FIG. 7A by the arrows 73 indicating a position change with respect to the center of the physical grid 61 and by the arrows 75 indicating a change in the angle with respect to the sites of the physical grid 61 which correspond to the axis of the occupancy grid coordinate system 17 (see FIGS. 1 and 2). The tracking of the vehicle position 23 in the physical grid 61 will be described in detail below. In the physical grid 61, the vehicle position 23 is generally related to the center of the physical grid 61 via an offset vector 77.

FIG. 7B depicts the logical grid 63 which is updated in accordance with a movement of the host vehicle 11. Due to the movement of the host vehicle 11, the original vehicle position 23 is shifted to a new vehicle position 81. The new vehicle position 81 depends on the velocity and the yaw rate of the vehicle 11 as will be explained in detail below. In accordance with the new vehicle position 81, the origin 67 of the virtual coordinate system 65 is also shifted by the same shift vector 83 to an updated origin position 67'.

At the same time, an area 85 in the logical grid 63 needs to be cleared, i.e. the rows and columns between the original origin 67 and the shifted origin 67' of the virtual coordinate system 65 define the area 85 in which the cells 64 of the logical grid 63 need to be updated. That is, for the cells in the area 85 the random variables are updated which describe the occupancy status of the respective cells 64.

Due to the mapping between the logical grid 63 and the physical grid 61 which is described in context of FIGS. 6A and 6B, the rows and columns of the area 85 to be updated correspond to cells 62 of the physical grid 61 which are removed on one side of the physical grid 61 and added on the opposite side of the physical grid 61. In the present example, due to the movement of the host vehicle 11 two rows on the upper side and three rows on the right side of the physical grid 61 will be added, while two rows on the lower side and three rows on the left side of the physical grid 61 will be removed. In other words, the physical grid 61 (see FIG. 6A) is moved with respect to the world coordinate system by the shift vector 83 as well which changes the field of view provided by the physical grid 61 accordingly.

In the logical grid 63 representing the occupancy grid 13 in the memory of the processing unit 39, however, the cells in the area 85 have to be updated only, while all the other cells are maintained and perhaps moved in accordance with the torus interconnection within the logical grid 63. It is noted that a small number of cells is depicted in FIGS. 6A, 6B, 7A, and 7B only for the physical grid 61 and the logical grid 63, and for realistic automotive scenarios, the total number of cells within an occupancy grid 13 will be much larger. Therefore, the ratio of cells in the area 85 to be updated to the total number of cells will be much smaller for such a realistic automotive scenario than for the logical grid 63 as depicted in FIG. 7B. In summary, the physical grid 61 is moved with respect to the world coordinate system 31 (see FIG. 2) by updating a small number of cells 64 within the area 85 in the logical grid 63, while a great majority of cells 64 of the logical grid 63 does not need to be updated. Hence, the physical grid 61 representing the occupancy grid 13 in the "real world" requires quite a low computational effort for updating in accordance to the movement of the host vehicle 11.

In the following, details for updating or revising the logical grid 63 and consequently the physical grid 61 will be provided in context with FIGS. 2, 6A, 6B, 7A, and 7B.

For sake of clarity, all variables mentioned in the following are 2-dimensional vectors, e.g. for the $$\text{position} = \begin{bmatrix} x_{position} \\ y_{position} \end{bmatrix}.$$

Therefore, all operations are performed on vectors and are repeated for the respective X-axis and Y-axis separately. Vectors in bold are discrete vectors represented as integer values. All other vectors include continuous values.

The input information required for performing the method according to the disclosure includes (see FIGS. 2, 6A, and 6B):

The previous position 23 of the host vehicle 11 on the physical grid 61 (i.e. a continuous position in the occupancy grid coordinate system 17) -position$_{previous}$;

The previous position of the virtual coordinate system 65 (i.e. of the origin 67 of virtual coordinate system 65) -origin offset$_{previous}$; and The change or modification of the absolute vehicle position 23 (i.e. in the world coordinate system 31) and of the state of movement of the host vehicle 11 from the previous to the current time: $-\dot{X}^{WCS}$, $\omega^{WCS}$, $\Delta^{WCS}$— velocity, yaw rate, position delta, This information can be obtained by the vehicle state sensor 38 (see FIG. 3) e.g. via the inertial measurement units, the global positioning system, odometry, etc.

For updating the physical grid 61 and the logical grid 63, the following processing steps are performed:

1. Compute a new ideal or desired position on the occupancy grid 13 (i.e. on the physical grid 61), corresponding to the new vehicle position 81 in the logical grid 61:

$$\text{position}_{current}^{ideal} = f(\dot{X}^{WCS}, \omega^{WCS}) \quad (1)$$

where f denotes a positioning function which may be constant or, for the present embodiment, depend on the velocity and/or the yaw rate (see also the arrows 73 and 75 as shown in FIG. 7A).

2. Compute by how many cells the virtual coordinate system 65 has to be shifted in the logical coordinate system 63 (see FIGS. 6B and 7B):

$$\text{position}_{shift} = \text{position}_{current}^{ideal} - \text{position}_{previous} \quad (2)$$

$$\text{grid}_{shift} = \Delta^{WCS} + \text{position}_{shift}$$

$$\text{cell number}_{shift} = \left\lfloor \frac{\text{grid}_{shift}}{\text{grid resolution}} \right\rfloor$$

$$\text{correction}_{shift} = \text{mod}(\text{grid}_{shift}, \text{grid resolution})$$

where the $\lfloor \; \rfloor$ brackets denote the floor function and mod is a modulo operation.

3. Update the host position in the physical grid 61 by considering a correction given as correction$_{shift}$. As mentioned above, the grid has a discrete representation, whereas the vehicle position is defined as continuous variable. Therefore, the correction is applied. As a result, the current position of the host vehicle 11 in the physical grid 61 is calculated as follows:

$$\text{position}_{current} = \text{position}_{current}^{ideal} + \text{correction}_{shift} \quad (3)$$

4. Shift the origin 67 of the virtual coordinate system 65 by cell number$_{shift}$ (see FIG. 7B):

origin offset$_{current}$ = (4)

mod(origin offset$_{previous}$ + cell number$_{shift}$ + grid subscript number, grid subscript number)

$$\text{grid subscript number} = \left\lfloor \frac{\text{grid size}}{\text{grid resolution}} \right\rfloor$$

The bracket denotes the floor function, whereas grid size denotes a length of the entire grid along the respective margin (e.g. in cm), whereas grid resolution denotes a length per number of cells, i.e. the lengths of a cell along one of axes of the occupancy grid coordinate system (in the same unit as grid size). For the examples as shown in FIGS. 6A, 6B, 7A and 7B, grid subscript number is therefore equal to 20. The equations (4) are managing the torus interconnection (i.e. the "wrapping" around the margins of the logical grid 63) due to the modulo function.

5. Update cells in the logical grid 63. The cells which need to be cleared in the area 85 between two origin offsets (see reference numerals 67 and 67' in FIG. 7B) are given as range:

area to clear=[origin offset$_{previous}$, origin offset$_{current}$]

Here the brackets [ ] describe a range of values (i.e. range [1, 4] will unwrap into indices {1,2,3,4}). It is noted that complete rows and/or columns of cells are updated only. In the example as shown in FIG. 7B, the area 85 denotes all cells marked for updating when the origin 67 of the virtual coordinate system 65 is shifted.

What is claimed is:

1. A computer-implemented method for arranging a grid with respect to a position of a host vehicle, wherein the grid includes a predefined number of cells, the method comprising:
determining an initial position and a state of movement of the host vehicle in an earth-fixed coordinate system;
defining a physical grid which specifies a spatial location of the cells of the grid with respect to the earth-fixed coordinate system;
defining a logical grid which represents the cells of the grid within a memory of a processing unit of the host vehicle;
determining an initial arrangement of the physical grid with respect to the initial position of the host vehicle;
defining a mapping between the physical grid and the logical grid;
defining a torus interconnection between margins of the logical grid;
determining a modification of the position of the host vehicle with respect to the earth-fixed coordinate system and with respect to the physical grid based on the state of movement of the host vehicle;
determining a revised logical grid based on the modification of the position of the host vehicle by applying the torus interconnection between the margins of the logical grid; and
determining a current arrangement of the physical grid with respect to the host vehicle based on the mapping of the revised logical grid.

2. The method according to claim 1, wherein the physical grid has a fixed orientation with respect to the earth-fixed coordinate system.

3. The method according to claim 1, wherein the torus interconnection relates opposite margins of the logical grid to each other.

4. The method according to claim 1, wherein the torus interconnection is implemented in a two-dimensional coordinate system.

5. The method according to claim 1, wherein the modification of the position of the host vehicle with respect to the physical grid depends on a predefined positioning function which specifies a desired position of the host vehicle in the physical grid.

6. The method according to claim 5, wherein the predefined positioning function provides a fixed position of the host vehicle in the physical grid.

7. The method according to claim 5, wherein the predefined positioning function depends on at least one of:
a velocity of the host vehicle determined by a vehicle state sensor, or
a yaw rate of the host vehicle determined by a vehicle state sensor.

8. The method according to claim 7, wherein the vehicle state sensor includes a global positioning for determining the position of the host vehicle with respect to the earth-fixed coordinate system.

9. The method according to claim 7, wherein the vehicle state sensor includes an inertial measurement unit (IMU) for determining the position of the host vehicle with respect to the earth-fixed coordinate system.

10. The method according to claim 1, wherein a virtual coordinate system is defined in the logical grid, wherein an origin of the virtual coordinate system corresponds to a reference position in the physical grid, and wherein the origin of the virtual coordinate system is shifted from an initial offset position to a current offset position in accordance with the modification of the position of the host vehicle.

11. The method according to claim 10, wherein cells to be updated in the logical grid are identified based on the initial offset position and the current offset position of the origin of the virtual coordinate system.

12. The method according to claim 11, wherein the initial offset position and the current offset position of the origin of the virtual coordinate system specify rows and columns of the logical grid which are to be updated.

13. The method according to claim 1, wherein the physical grid is defined with respect to a grid coordinate system, wherein a correction defined in the grid coordinate system is calculated for the position of the host vehicle in relation to a cell in which the host vehicle is currently located, and wherein the correction depends at least partly on a difference of the initial position and a current position of the host vehicle in the earth-fixed coordinate system.

14. The method according to claim 1, wherein the modification of the position of the host vehicle with respect to the earth-fixed coordinate system is determined by using a Kalman filter.

15. A device for arranging a grid with respect to a position of a host vehicle, wherein the grid includes a predefined number of cells, the device comprising:
at least one vehicle state sensor configured to detect an initial position of the host vehicle and a state of movement of the host vehicle in an earth-fixed coordinate system; and
a processing unit, wherein the processing unit is configured to:
define a physical grid which specifies a spatial location of the cells of the grid with respect to the earth-fixed coordinate system;
define a logical grid which represents the cells of the grid within a memory of a processing unit of the host vehicle;
determine an initial arrangement of the physical grid with respect to the initial position of the host vehicle;
define a mapping between the physical grid and the logical grid;
define a torus interconnection between margins of the logical grid;
determine a modification of the position of the host vehicle with respect to the earth-fixed coordinate system and with respect to the physical grid based on the state of movement of the host vehicle;
determine a revised logical grid based on the modification of the position of the host vehicle by applying the torus interconnection between the margins of the logical grid; and
determine a current arrangement of the physical grid with respect to the host vehicle based on the mapping of the revised logical grid.

16. A non-transitory computer-readable medium storing a set of instructions for arranging a grid with respect to a position of a host vehicle, wherein the grid includes a predefined number of cells, the set of instructions comprising:
one or more instructions that, when executed by one or more processors of a device, cause the device to:
determine an initial position and a state of movement of the host vehicle in an earth-fixed coordinate system;
define a physical grid which specifies a spatial location of the cells of the grid with respect to the earth-fixed coordinate system;
define a logical grid which represents the cells of the grid within a memory of a processing unit of the host vehicle;
determine an initial arrangement of the physical grid with respect to the initial position of the host vehicle;
define a mapping between the physical grid and the logical grid;
define a torus interconnection between margins of the logical grid;
determine a modification of the position of the host vehicle with respect to the earth-fixed coordinate system and with respect to the physical grid based on the state of movement of the host vehicle;
determine a revised logical grid based on the modification of the position of the host vehicle by applying the torus interconnection between the margins of the logical grid; and
determine a current arrangement of the physical grid with respect to the host vehicle based on the mapping of the revised logical grid.

17. The non-transitory computer-readable medium of claim 16, further comprising one or more instructions that, when executed by one or more processors of a device, cause the device to:
determine the modification of the position of the host vehicle with respect to the physical grid, wherein the modification depends on a predefined positioning function which specifies a desired position of the host vehicle in the physical grid; and
determine the modification of the position of the host vehicle with respect to the earth-fixed coordinate system, wherein the modification is determined by using a Kalman filter.

18. The non-transitory computer-readable medium of claim 16, further comprising one or more instructions that, when executed by one or more processors of a device, cause the device to:
define a virtual coordinate system in the logical grid, wherein an origin of the virtual coordinate system corresponds to a reference position in the physical grid, and wherein the origin of the virtual coordinate system is shifted from an initial offset position to a current offset position in accordance with the modification of the position of the host vehicle.

19. The non-transitory computer-readable medium of claim 16, further comprising one or more instructions that, when executed by one or more processors of a device, cause the device to:
define the physical grid with respect a grid coordinate system, wherein a correction defined in the grid coordinate system is calculated for the position of the host vehicle in relation to a cell in which the host vehicle is currently located, and wherein the correction depends at least partly on a difference of the initial position and a current position of the host vehicle in the earth-fixed coordinate system.

20. The non-transitory computer-readable medium of claim 16, further comprising one or more instructions that, when executed by one or more processors of a device, cause the device to:
define the physical grid which specifies the spatial location of the cells of the grid with respect to the earth-fixed coordinate system, wherein the physical grid has a fixed orientation with respect to the earth-fixed coordinate system; and
define the torus interconnection between margins of the logical grid, wherein the torus interconnection relates opposite margins of the logical grid to each other, and wherein the torus interconnection is implemented in a two-dimensional coordinate system.

* * * * *